(12) United States Patent
Handley et al.

(10) Patent No.: US 8,577,757 B2
(45) Date of Patent: Nov. 5, 2013

(54) INVENTORY MANAGEMENT SYSTEM IN A PRINT-PRODUCTION ENVIRONMENT

(75) Inventors: John C. Handley, Fairport, NY (US); Yasin Alan, Ithaca, NY (US)

(73) Assignee: Xerox Corporation, Norwalk, CT (US)

( * ) Notice: Subject to any disclaimer, the term of this patent is extended or adjusted under 35 U.S.C. 154(b) by 745 days.

(21) Appl. No.: 12/425,545

(22) Filed: Apr. 17, 2009

(65) Prior Publication Data

US 2010/0268572 A1 Oct. 21, 2010

(51) Int. Cl.
*G06Q 10/00* (2012.01)

(52) U.S. Cl.
USPC ............................................. 705/28; 705/10

(58) Field of Classification Search
USPC .......................................................... 705/28
See application file for complete search history.

(56) References Cited

U.S. PATENT DOCUMENTS

| | | | | |
|---|---|---|---|---|
| 5,504,692 A | * | 4/1996 | Cardner | 700/266 |
| 6,134,534 A | * | 10/2000 | Walker et al. | 705/5 |
| 7,379,890 B2 | * | 5/2008 | Myr et al. | 705/7.35 |
| 7,806,825 B2 | * | 10/2010 | Heim | 600/453 |
| 7,844,517 B2 | * | 11/2010 | Willen et al. | 705/35 |
| 2002/0143669 A1 | * | 10/2002 | Scheer | 705/28 |
| 2009/0327033 A1 | * | 12/2009 | Rai et al. | 705/10 |
| 2010/0082458 A1 | * | 4/2010 | Godlewski | 705/28 |

* cited by examiner

*Primary Examiner* — Garcia Ade
(74) *Attorney, Agent, or Firm* — Fox Rothschild LLP

(57) ABSTRACT

An inventory management system for forecasting demand in a print production environment may include a computing device and a computer-readable storage medium in communication with the computing device. The computer-readable storage medium may include programming instructions for updating a predictive model with intervention information comprising an anticipated demand value and a confidence value associated with the anticipated demand value. The predictive model may be associated with a demand distribution of a print-related service. The computer-readable storage medium may include programming instructions for generating a demand forecast associated with the print-related service by using the updated predictive model, using the generated demand forecast to compare a current inventory level associated with the print-related service to an anticipated inventory level associated with the demand forecast of the print-related service, and ordering additional inventory in response to the current inventory level being less than the anticipated inventory level.

18 Claims, 3 Drawing Sheets

INVENTORY MANAGEMENT SYSTEM IN A PRINT-PRODUCTION ENVIRONMENT

BACKGROUND

Inventory management systems in production environments require sufficient inventory to satisfy demand. To avoid stockouts and to reduce costs associated with holding inventory, it is common for inventory management systems to predict inventory levels by forecasting demand from historical demand data. However, this type of forecasting is often challenging for inventory with scant historical data. For example, some inventory may only have quarterly inventory information going back one year. Models of such inventory information typically yield inaccurate results, and fitting models of such information by hand is time consuming and cumbersome.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, an inventory management system for forecasting demand in a print production environment may include a computing device and a computer-readable storage medium in communication with the computing device. The computer-readable storage medium may include one or more programming instructions for updating a predictive model with intervention information comprising an anticipated demand value and a confidence value associated with the anticipated demand value. The predictive model may be associated with a demand distribution of a print-related service in a print production environment. The computer-readable storage medium may include one or more programming instructions for generating a demand forecast associated with the print-related service by using the updated predictive model, using the generated demand forecast to compare a current inventory level associated with the print-related service to an anticipated inventory level associated with the demand forecast of the print-related service, and ordering additional inventory in response to the current inventory level being less than the anticipated inventory level.

In an embodiment, a method of forecasting demand in a print production environment may include updating a predictive model with intervention information including an anticipated demand value and a confidence value associated with the anticipated demand value. The predictive model may be associated with a demand distribution of a print-related service in a print production environment. The method may include generating a demand forecast associated with the print-related service by using the updated predictive model, using the generated demand forecast to compare a current inventory level associated with the print-related service to an anticipated inventory level associated with the demand forecast of the print-related service and ordering additional inventory in response to the current inventory level being less than the anticipated inventory level.

BRIEF DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a "print production environment" refers to an entity that includes a plurality of print production resources. A print production environment may be a freestanding entity, including one or more print-related devices, or it may be part of a corporation or other entity. Additionally, a print production environment may communicate with one or more servers by way of a local area network or a wide area network, such as the Internet, the World Wide Web or the like.

A "print production resource" refers to a device capable of performing one or more print-related services. A print production resource may include a printer, a cutter, a collator or the like.

A "job" refers to a logical unit of work that is to be completed for a customer. A job may include one or more print jobs from one or more clients. A print production environment may include a plurality of jobs.

A "print job" refers to a job processed in a print production environment. For example, a print job may include producing credit card statements corresponding to a certain credit card company, producing bank statements corresponding to a certain bank, printing a document, or the like.

A "print-related service" refers to a service performed by one or more print production resources. For example, copying, scanning, collating and binding are exemplary print-related services.

Figure 1:
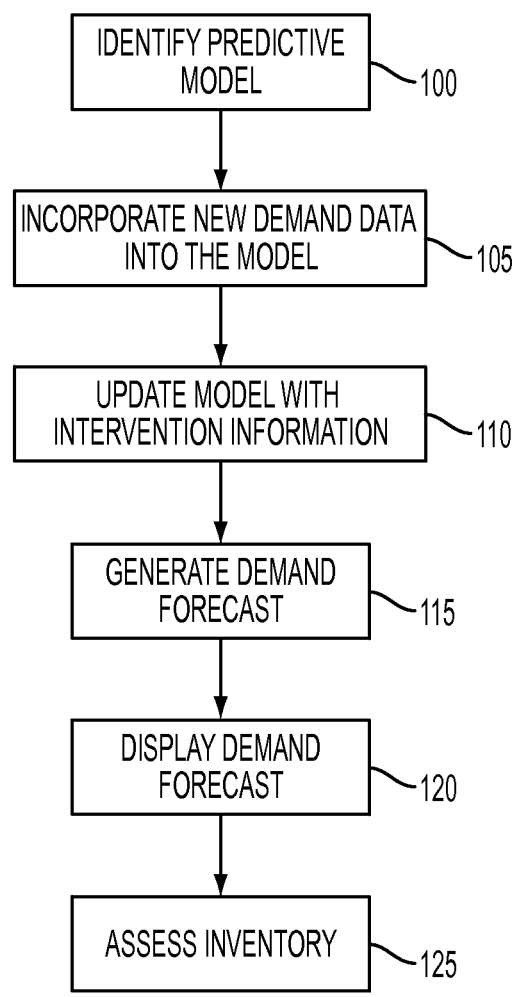
FIG. 1 illustrates an exemplary method of forecasting demand in a print production environment according to an embodiment.

FIG. 1 illustrates an exemplary method of forecasting demand in a print production environment according to an embodiment. As illustrated by FIG. 1, a predictive model may be identified 100. In an embodiment, a predictive model may be a mathematical or statistical model for forecasting time series data. For example, a Bayesian model may be a predictive model.

In an embodiment, the identified model may be associated with a demand distribution of a print-related service in the print production environment. In an embodiment, a demand distribution may refer to demand for the print-related service over a period of time. For example, a model may correspond to a binding print-related service in a print production environment. The model may be associated with a demand distribution corresponding to binding, and the demand distribution may represent the number of print jobs requiring binding over a certain time period.

In an embodiment, the difficulties associated with forecasting demand in a print production environment may be ameliorated by the incorporation of historical data, subjective estimates of likely demand behavior, an ability to modify forecasted values, an assignment of uncertainty values to the forecasts to estimate the probability of satisfying service level agreements and/or the like.

In an embodiment, product demand may be represented as a series of values. Product demand may be the demand associated with print production inventory such as supplies for creating print jobs, finished print jobs and/or the like. In an embodiment, the series of values may include variation, and may be represented as a time series, random process and/or the like. An inventory system may use the observations of a time series of historical demand to predict or forecast future demand so that sufficient inventory may be available to satisfy the future demand.

For example, a First Order Dynamic Linear Model may have an observation part and a system part. Each part may represent a source of uncertainty about future values. In an embodiment, new observations may be used to update the system part of the model. Updating the model may allow it to track changing demand distributions which may be helpful in forecasting potentially erratic behavior of a print production environment.

In an embodiment, the observation part may capture the uncertainty in observing the true value if the underlying process was known. The observation part may be represented as follows:

$$Y_t = \mu_t + v_t, v_t \sim N(0, V),$$

where:
$Y_t$ is a random variable representing the observation,
$\mu_t$ is a mean value of the process at time t,
$v_t$ is a random error associated with observation uncertainty at time t, and
V is the variance of the random error $v_t$.
The system part may be represented as follows:

$$\mu_t = G_t \mu_{t-1} + \omega_t, w_t \sim N(0, W),$$

where
$\mu_t$ is a mean value of the forecast,
$G_t$ is a constant value,
$\mu_{t-1}$ is a mean value of the previous forecast, and
W is a variance associated with $\mu t$.

In an embodiment, the model may include historical data associated with a print-related service. For example, the model may be generated using observed demand information associated with the print-related service over a certain period of time. For instance, a model corresponding to a binding print-related service may incorporate demand information associated with print jobs requiring binding over a previous one-year period. Other time periods may be used within the scope of this disclosure.

In an embodiment, the demand data associated with a print-related service that has been observed up to time t may be represented as follows:

$$D_t = \{Y_t, D_{t-1}\}.$$

In an embodiment, new demand data may be incorporated 105 into a model for a print-related service. The new demand data may include observed demand data over a certain time period. For example, a model corresponding to a binding print-related service may include historical data through the previous day. When demand data associated with the binding print-related service is observed for the current day, that demand data may be incorporated 105 into the model. In an embodiment, forecasting may be done recursively. Initial values of the mean, $m_0$, the variance, $C_0$, the observation variance, V, and/or the system variance, W may be subjectively estimated. As more data is included in the model, the initial values may be less influential on the forecast.

In an embodiment, the incorporation of new demand data into a model may be represented by the following:

Posterior to observing $Y_{t-1}$: $(u_{t-1}|D_{t-1}) \sim N(m_{t-1}, C_{t-1})$, where $m_{t-1}$ is the mean of the print demand process at time t−1, and $C_{t-1}$ is the variance of the print demand process at time t−1.

In an embodiment, the mean and variance may be updated when a new observation is available.

Prior to observing $Y_t$, the distribution of the mean of the system part may be represented by: $(u_t|D_{t-1}) \sim N(m_{t-1}, R_t)$, where $R_t = C_{t-1} + W$ Distribution of the demand at time t, $Y_t$, based on all demand information before time t:

$$(Y_t|D_{t-1}) \sim N(f_t, Q_t), \text{ where } f_t = m_{t-1} \text{ and } Q_t = C_{t-1} + W + V.$$

Posterior to observing $Y_t$: $(u_t|D_t) \sim N(m_t, C_t)$ where $m_t = m_{t-1} + A(Y_t - f_t)$ where $C_t = A_t V$, $$A_t = \frac{R_t}{Q_t} = \frac{C_{t-1} + W}{C_{t-1} + W + V}, \text{ and}$$

$$C_t = V \frac{C_{t-1} + W}{C_{t-1} + W + V}.$$

In an embodiment, the forecast for demand at time t may be the estimated mean of $Y_t$: $f_t = m_{t-1}$. An estimate of the variance of the demand $Y_t$ may be represented by $Q_t = C_{t-1} + W + V$, and this variance estimate may be used to compute a confidence interval around the forecast $f_t = m_{t-1}$.

In an embodiment, the model may be updated 110 with intervention information. Intervention information may be provided by a user and may include demand information that is outside of the model. In an embodiment, intervention information may include an anticipated demand value associated with a time and/or a confidence value associated with the anticipated demand value. For example, intervention information may be represented as probability statements, such as "next quarter we expect demand to be double the historical average, plus or minus 10%." In this example, the anticipated demand value is an amount equal to double the historical average, and the confidence value is +/−10%.

In an embodiment, the model associated with the intervention information may be updated 110 to account for the intervention information. As such, the model may be updated 110 with principled intervention information that is outside of the model to anticipate demand changes.

For example, suppose at time t, a user knows that the mean associated with a demand distribution corresponding to a print-related service will increase by η, and the uncertainty associated with η is represented by variance $\rho^2$. A user may intervene to update the observational error, $\omega_t$, at time t: $(\omega_t \sim N(\eta, \rho^2))$ and thus:

$$\mu_t | D_{t-1} = \mu_{t-1} | D_{t-1} + \omega_t | D_{t-1}; \text{ and}$$

$$(\mu_t | D_{t-1}) \sim N(m_{t-1} + \eta, C_{t-1} + V + \rho^2).$$

The updated forecast may be represented by:

$$(Y_t | D_{t-1}) \sim N(m_{t-1} + \eta, C_{t-1} + V_t + \rho^2).$$

In an embodiment, the model may be updated with a new mean represented by $m_{t-1}+\eta$ and a new system variance represented by $W_t=p^2$.

In an embodiment, a demand forecast associated with a print-related function may be generated 115 using the updated predictive model. The demand forecast may be an estimate of the demand associated with a print-related service at a certain time. In an embodiment, the demand forecast may also include an error value which may represent the uncertainty associated with the demand forecast.

EXAMPLE 1

Updating a Model

Initial knowledge may be represented as follows:
Observation Equation:

$$Y_t=\mu_t+v_t, v_t \sim N(0,100) V=100;$$

System Equation:

$$\mu_t=\mu_{t-1}+\omega_t, \omega_t \sim N(0,5) W=5;$$

Initial Information:

$$(u_0|D_0) \sim N(m_0,C_0)=N(130,400) m_0=130, C_0=400$$

At time t=1:
The system model before observing $Y_1$ may be represented by the following:

$$(u_1|D_0) \sim N(m_0,R_1);$$

$$m_1=m_0=130;$$

$$R=C_0+W=400+5=405.$$

The forecast $Y_1$ before a value of $Y_1$ is observed, may be represented by the following:

$$f_1=m_0=130, \text{ with a variance } Q_1=C_0+W+V=400+5+100=505.$$

If it is observed that $Y_1=150$, the model may be updated:

$$(u_1 | D_1) \sim N(m_1, C_1)$$

$$C_1 = V\left(\frac{C_0+W}{C_0+W+V}\right) = 100\left(\frac{400+5}{400+5+100}\right) = 80.2,$$

$$A_1 = \left(\frac{C_0+W}{C_0+W+V}\right) = \left(\frac{400+5}{400+5+100}\right) = 0.802,$$

$$m_1 = m_0 + A_1(Y_1 - f_1) = 130 + 0.802(150-130) = 146.2$$

$$(u_1 | D_1) \sim N(146.2, 80.2)$$

At time t=2:
The system model before observing $Y_2$ may be represented by the following:

$$(u_2|D_1) \sim N(m_1,R_2);$$

$$m_1=146.2;$$

$$R_2=C_1+W=80.2+5=85.2.$$

The forecast $Y_2$, before a value of $Y_2$ is observed, may be represented by the following:

$$f_2=m_1=146.2, \text{ with a variance } Q_2=C_1+W+V=80.2+5+100=185.2.$$

If it is observed that $Y_2=136$, the model may be updated:

$$(u_2 | D_2) \sim N(m_2, C_2)$$

$$C_2 = V\left(\frac{C_1+W}{C_1+W+V}\right) = 100\left(\frac{80.2+5}{80.2+5+100}\right) = 46.0,$$

$$A_1 = \left(\frac{C_1+W}{C_1+W+V}\right) = \left(\frac{80.2+5}{80.2+5+100}\right) = 0.46,$$

$$m_2 = m_1 + A_2(Y_2-f_2) = 146.2 + 0.46(136-146.2) = 141.5,$$

$$(u_2 | D_2) \sim N(141.5, 46.0).$$

The model may continue to be updated for any number of observations. Table 1 illustrates an exemplary chart of values associated with a model before and after a value of Y is observed.

TABLE 1

| | | Before Observing Y | | | | After Observing Y | | |
|---|---|---|---|---|---|---|---|---|
| t | $Y_t$ | $m_t$ | $R_t$ | $f_t$ | $Q_t$ | $m_t$ | $C_t$ | $A_t$ |
| 1 | 150 | 130.00 | 405.00 | 130.00 | 505.00 | 146.04 | 80.20 | 0.80 |
| 2 | 136 | 146.04 | 85.20 | 146.04 | 185.20 | 141.42 | 46.00 | 0.46 |
| 3 | 135 | 141.42 | 51.00 | 141.42 | 151.00 | 139.25 | 33.78 | 0.34 |
| 4 | 114 | 139.25 | 38.78 | 139.25 | 138.78 | 132.20 | 27.94 | 0.28 |
| 5 | 137 | 132.20 | 32.94 | 132.20 | 132.94 | 133.39 | 24.78 | 0.25 |
| 6 | 149 | 133.39 | 29.78 | 133.39 | 129.78 | 136.97 | 22.95 | 0.23 |
| 7 | 130 | 136.97 | 27.95 | 136.97 | 127.95 | 135.45 | 21.84 | 0.22 |
| 8 | 130 | 135.45 | 26.84 | 135.45 | 126.84 | 134.29 | 21.16 | 0.21 |
| 9 | 123 | 134.29 | 26.16 | 134.29 | 126.16 | 131.95 | 20.74 | 0.21 |
| 10 | 128 | 131.95 | 25.74 | 131.95 | 125.74 | 131.14 | 20.47 | 0.20 |
| 11 | 128 | 131.14 | 25.47 | 131.14 | 125.47 | 130.51 | 20.30 | 0.20 |
| 12 | 130 | 130.51 | 25.30 | 130.51 | 125.30 | 130.40 | 20.19 | 0.20 |
| 13 | 121 | 130.40 | 25.19 | 130.40 | 125.19 | 128.51 | 20.12 | 0.20 |
| 14 | 114 | 128.51 | 25.12 | 128.51 | 125.12 | 125.60 | 20.08 | 0.20 |
| 15 | 125 | 125.60 | 25.08 | 125.60 | 125.08 | 125.48 | 20.05 | 0.20 |

EXAMPLE 2

Intervention

Suppose it is known that the demand associated with a print-related service will increase by 200 documents per day from time t=9 to t=10 due to a new customer. This information may be represented as $\eta=200$. The uncertainty associated with this estimate may be represented by $\rho^2=300$. The new model may intervene at time t=10 by increasing the model mean by 200, and the variance by $\rho^2$ rather than W. For example, $Q_t=C_{t-1}+\rho^2$ rather than $Q_t=C_{t-1}+W$. As such, $(Y_t|D_{t-1}) \sim N(m_{t-1}+\eta, C_{t-1}+V+\rho^2)$. The forecast $f_{10}$ may now equal $m_9+200$.

For example, using the information in Example 1 and Table 1, at time t=9, $(u_9|D_9) \sim N(m_9, C_9)=N(134.29, 20.74)$. Before observing $Y_{10}=320$, $Y_{10}$ is forecasted as $f_{10}=m_9+200=334.29$ with variance $Q=(100+20.74+300)=420.74$. Table 2 illustrates an exemplary chart of values associated with a model having an intervention at time t=10.

TABLE 2

| | | Before Observing Y | | | | After Observing Y | | |
|---|---|---|---|---|---|---|---|---|
| t | $Y_t$ | $m_t$ | $R_t$ | $f_t$ | $Q_t$ | $m_t$ | $C_t$ | $A_t$ |
| 1 | 150 | 130.00 | 405.00 | 130.00 | 505.00 | 146.04 | 80.20 | 0.80 |
| 2 | 136 | 146.04 | 85.20 | 146.04 | 185.20 | 141.42 | 46.00 | 0.46 |
| 3 | 135 | 141.42 | 51.00 | 141.42 | 151.00 | 139.25 | 33.78 | 0.34 |

TABLE 2-continued

| | Before Observing Y | | | | After Observing Y | | |
|---|---|---|---|---|---|---|---|
| t | $Y_t$ | $m_t$ | $R_t$ | $f_t$ | $Q_t$ | $m_t$ | $C_t$ | $A_t$ |
| 4 | 114 | 139.25 | 38.78 | 139.25 | 138.78 | 132.20 | 27.94 | 0.28 |
| 5 | 137 | 132.20 | 32.94 | 132.20 | 132.94 | 133.39 | 24.78 | 0.25 |
| 6 | 149 | 133.39 | 29.78 | 133.39 | 129.78 | 136.97 | 22.95 | 0.23 |
| 7 | 130 | 136.97 | 27.95 | 136.97 | 127.95 | 135.45 | 21.84 | 0.22 |
| 8 | 130 | 135.45 | 26.84 | 135.45 | 126.84 | 134.29 | 21.16 | 0.21 |
| 9 | 123 | 134.29 | 26.16 | 134.29 | 126.16 | 131.95 | 20.74 | 0.21 |
| 10 | 320 | 131.95 | 25.74 | 334.29 | 420.74 | 129.51 | 20.47 | 0.20 |
| 11 | 350 | 129.51 | 25.47 | 329.51 | 420.47 | 133.67 | 20.30 | 0.20 |
| 12 | 310 | 133.67 | 25.30 | 333.67 | 420.30 | 128.89 | 20.19 | 0.20 |
| 13 | 330 | 128.89 | 25.19 | 328.89 | 420.19 | 129.11 | 20.12 | 0.20 |
| 14 | 305 | 129.11 | 25.12 | 329.11 | 420.12 | 124.27 | 20.08 | 0.20 |
| 15 | 345 | 124.27 | 25.08 | 324.27 | 420.08 | 128.43 | 20.05 | 0.20 |

Figure 2:
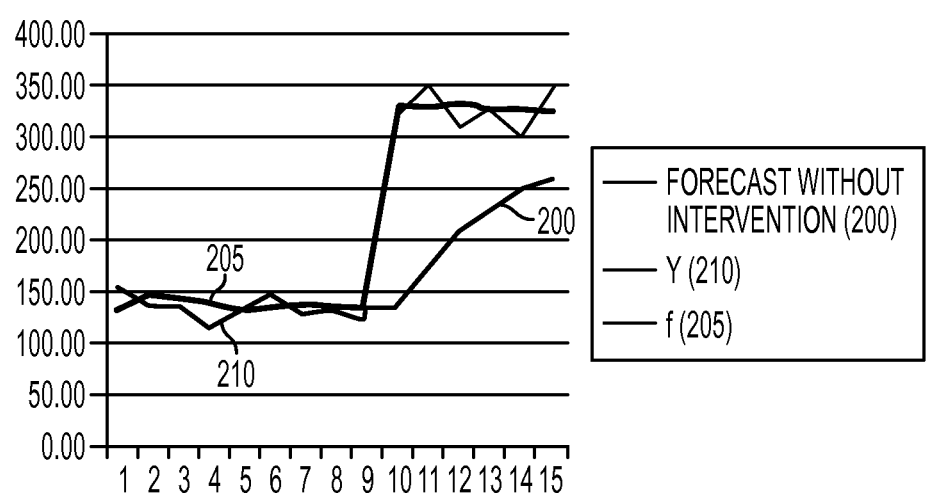
FIG. 2 illustrates exemplary time series according to an embodiment.

FIG. 2 illustrates an exemplary graph of $Y_t$ 210, the time series with intervention 205 and the time series without intervention 200. As illustrated by FIG. 2, the model requires a significant amount of time to adjust without the use of intervention.

In an embodiment, the demand forecast may be displayed 120 to a user on a graphical user interface. For example, the demand forecast may be displayed 120 to a user on a computer, a mobile computing device, a print production resource and/or the like. The demand forecast may be displayed 120 as a graphical representation, a chart representation and/or the like.

In an embodiment, an amount of inventory associated with a print-related function may be assessed 125 using the generated demand forecast. For example, a current inventory level may be compared to an inventory level necessary to supply the demand forecast. If the currently inventory level does not exceed the inventory level necessary to supply the demand forecast, additional inventory may be ordered.

Figure 3:
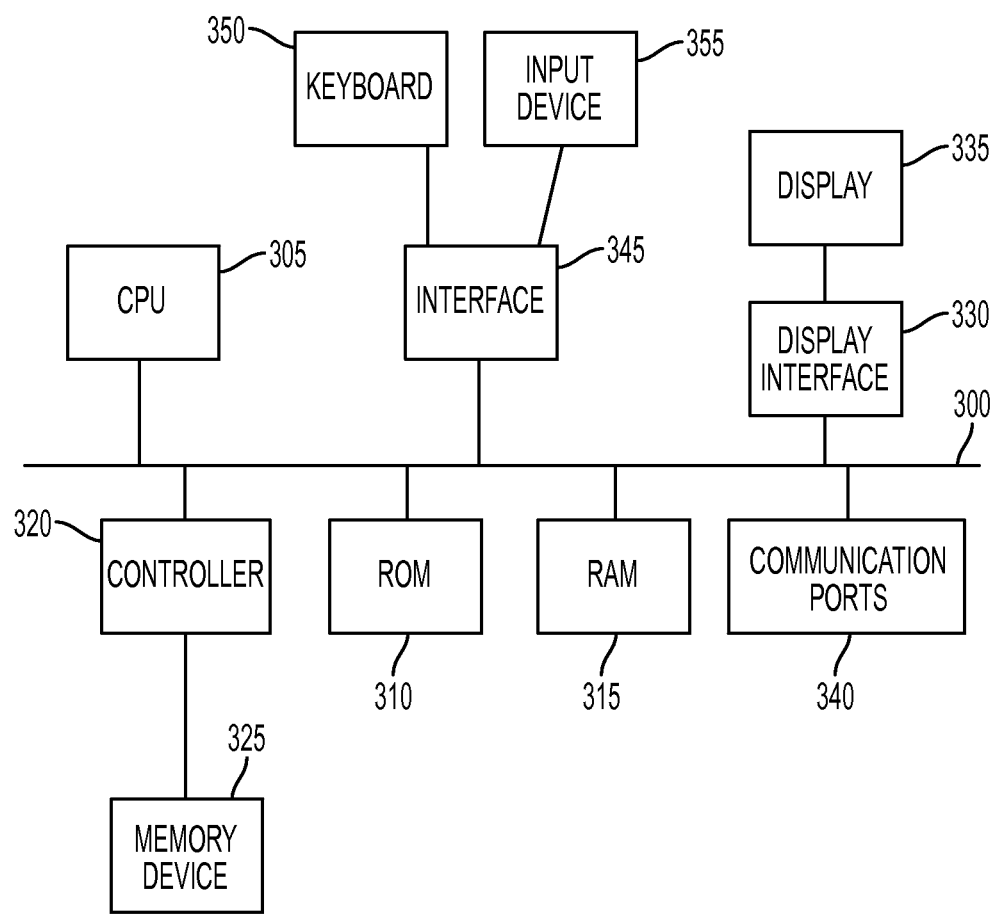
FIG. 3 depicts a block diagram of exemplary internal hardware that may be used to contain or implement program instructions according to an embodiment.

FIG. 3 depicts a block diagram of exemplary internal hardware that may be used to contain or implement program instructions according to an embodiment. A bus 300 serves as the main information highway interconnecting the other illustrated components of the hardware. CPU 305 is the central processing unit of the system, performing calculations and logic operations required to execute a program. Read only memory (ROM) 310 and random access memory (RAM) 315 constitute exemplary memory devices.

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions may be stored in the ROM 310 and/or the RAM 315. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 330 may permit information from the bus 300 to be displayed on the display 335 in audio, visual, graphic or alphanumeric format. Communication with external devices may occur using various communication ports 340. An exemplary communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An inventory management system for forecasting demand in a print production environment, the system comprising:
   a computing device; and
   a computer-readable storage medium in communication with the computing device, the computer-readable storage medium comprising one or more programming instructions for:
      updating a predictive model, by a computing device, with intervention information that is outside of the predictive model, wherein the intervention information comprises an anticipated demand value and a confidence value associated with the anticipated demand value, wherein the predictive model is associated with a demand distribution of a print-related service in a print production environment,
      incorporating new demand data into the predictive model associated with the print-related service, wherein the new demand data comprises an observed demand value associated with a time period, wherein the one or more programming instructions for incorporating new demand data into the predictive model comprise one or more programming instructions for:
         identifying a mean value associated with the demand distribution,
         determining an error value equal to a difference between the observed demand value and a previous forecast value associated with the print-related service,
         determining a weighted error value by multiplying the error value by a weight value, and
         identifying a new mean value associated with the demand distribution by summing the mean value and the weighted error value,
      generating a demand forecast associated with the print-related service by using the updated predictive model,
      using the generated demand forecast to compare a current inventory level associated with the print-related service to an anticipated inventory level associated with the demand forecast of the print-related service, and
      ordering additional inventory in response to the current inventory level being less than the anticipated inventory level.

2. The system of claim 1, wherein the one or more programming instructions for updating a predictive model comprise one or more programming instructions for:
   identifying a predictive model that incorporates historical demand data associated with the print-related service.

3. The system of claim 2, wherein the one or more programming instructions for identifying a predictive model comprise one or more programming instructions for generating the predictive model using historical data received from one or more print devices that offer the print-related service.

4. The system of claim 2, wherein the one or more programming instructions for identifying a predictive model comprise one or more programming instructions for generating the predictive model using historical data received from a user.

5. The system of claim 2, wherein the one or more programming instructions for identifying a predictive model comprise one or more programming instructions for identifying a Bayesian time series model.

6. The system of claim 1, wherein the one or more programming instructions for updating the predictive model with intervention information comprise one or more programming instructions for:
receiving, from a user, the anticipated demand value and the confidence value, wherein the anticipated demand value for the print-related service represents a demand at one or more times, wherein the confidence value represents a probability that the anticipated demand value is within a range; and
incorporating the received anticipated demand value and the received confidence value into the predictive model.

7. The system of claim 1, wherein the one or more programming instructions for updating the predictive model with intervention information comprise one or more programming instructions for:
updating the predictive model with intervention information represented by a probability statement comprising the anticipated demand value and the confidence value.

8. The system of claim 1, further comprising one or more programming instructions for: displaying, via the computing device, the generated demand forecast.

9. The system of claim 1, further comprising:
a print production resource configured to perform the print-related service, wherein the one or more programming instructions further comprise one or more programming instructions for displaying, via the print production resource, the generated demand forecast.

10. A method of forecasting demand in a print production environment, the method comprising:
updating a predictive model, by a computing device, with intervention information that is outside of the predictive model, wherein the intervention information comprises an anticipated demand value and a confidence value associated with the anticipated demand value, wherein the predictive model is associated with a demand distribution of a print-related service in a print production environment;
incorporating, by a computing device, new demand data into the predictive model associated with the print-related service, wherein the new demand data comprises an observed demand value associated with a time period, wherein incorporating new demand data into the predictive model comprises:
identifying a mean value associated with the demand distribution,
determining an error value equal to a difference between the observed demand value and a previous forecast value associated with the print-related service,
determining a weighted error value by multiplying the error value by a weight value, and
identifying a new mean value associated with the demand distribution by summing the mean value and the weighted error value,
generating a demand forecast associated with the print-related service by using the updated predictive model;
using the generated demand forecast to compare a current inventory level associated with the print-related service to an anticipated inventory level associated with the demand forecast of the print-related service; and
ordering additional inventory in response to the current inventory level being less than the anticipated inventory level.

11. The method of claim 10, wherein updating a predictive model comprises: identifying a predictive model that incorporates historical demand data associated with the print-related service.

12. The method of claim 11, wherein the identifying a predictive model comprises generating a predictive model using historical data received from one or more print devices that offer the print-related service.

13. The method of claim 11, wherein identifying a predictive model comprises generating a predictive model using historical data received from a user.

14. The method of claim 11, wherein identifying a predictive model comprises identifying a Bayesian time series model.

15. The method of claim 10, wherein updating the predictive model with intervention information comprises:
receiving, from a user, the anticipated demand value and the confidence value, wherein the anticipated demand value for the print-related service represents a demand at one or more times, wherein the confidence value represents a probability that the anticipated demand value is within a range; and
incorporating the received anticipated demand value and the received confidence value into the predictive model.

16. The method of claim 10, wherein updating the predictive model with intervention information comprises:
updating the predictive model with intervention information represented by a probability statement comprising the anticipated demand value and the confidence value.

17. The method of claim 10, further comprising: displaying, via the computing device, the generated demand forecast.

18. The method of claim 10, further comprising: displaying, via a print production resource, the generated demand forecast.

* * * * *